United States Patent
Takács et al.

[11] Patent Number: 5,194,152
[45] Date of Patent: Mar. 16, 1993

[54] APPARATUS TO CONTACT LIQUIDS OF DIFFERENT DENSITY

[75] Inventors: István Takács; Gyula Beszedics; György Fábry; Péter Rudolf, all of Budapest, Hungary

[73] Assignee: Richter Gedeon Vegyeszeti Gyar Rt., Hungary

[21] Appl. No.: 671,904
[22] PCT Filed: Jul. 18, 1990
[86] PCT No.: PCT/HU90/00048
  § 371 Date: Mar. 18, 1991
  § 102(e) Date: Mar. 18, 1991
[87] PCT Pub. No.: WO91/01170
  PCT Pub. Date: Feb. 7, 1991

[51] Int. Cl.$^5$ ............................. B01D 11/04
[52] U.S. Cl. ................. 210/255; 196/14.52; 210/252; 210/634; 261/155; 422/256; 422/257
[58] Field of Search ............... 210/255, 259, 262, 511, 210/634; 422/256, 225, 257, 229, 258, 259; 196/14.52, 46; 366/290, 293; 261/155

[56] References Cited

U.S. PATENT DOCUMENTS

| | | | |
|---|---|---|---|
| 3,536,453 | 10/1970 | Sokov et al. | 422/257 |
| 3,837,812 | 9/1974 | Boontje | 422/257 |
| 4,276,244 | 6/1981 | Gyorgy et al. | 261/155 |
| 4,424,131 | 1/1984 | Baird | 210/634 |
| 4,541,724 | 9/1985 | Cornelissen | 366/293 |
| 4,855,113 | 8/1989 | Yen | 422/257 |

FOREIGN PATENT DOCUMENTS

2051602A  1/1981  United Kingdom .

*Primary Examiner*—Robert A. Dawson
*Assistant Examiner*—David Reifsnyder
*Attorney, Agent, or Firm*—Blakely, Sokoloff, Taylor & Zafman

[57] ABSTRACT

The apparatus has a column (1) of closed interior. Pipe (7b) leading into its upper part to admit liquid of higher density, and pipe (7a) leading into the lower part to admit liquid of lower density. Pipes (8, 10) emerge from the lower part to discharge liquid of higher density, and from its upper part to discharge liquid of lower density. Level control and propelling force adjusting mechanism (9) is connected with the pipe discharging liquid of higher density. Dispersing-mixing elements surrounding cells are beneath and above each other in the column (1). Pulsator (4) is connected with the lower part of column (1). The dispersing-mixing elements are formed by discs (5) having elastic tongues (13a) in the plane of discs capable for vibration and to move out of the disc's plane during vibration, and gap (14) runs along the periphery of the tongues (13a).

6 Claims, 5 Drawing Sheets

APPARATUS TO CONTACT LIQUIDS OF DIFFERENT DENSITY

The invention relates to an apparatus used to contact liquids of different density, more specifically, an apparatus such as a to liquid extractor.

Several types of columnar liquid extractors are known to be used with auxiliary energy to ensure radial mixing between the liquids to be contacted. One of these extractors has a vertical cylindrical casing - column - with a central vertical rotatable shaft on which mixing elements, e.g. blades or discs are mounted line by line. The rotation disperses one of the liquids into the counterflowing other liquid (in continuous phase). In some of these columntype extractors, the mixing zones (stages) are separated by sedimentators (e.g. packing layers, perforated bodies, nets of sieve cloth, etc.). The theoretical number of stages of these mixing-column-type extractors is 2–7 per meter, and the specific load is 20–30 $m^3/m^2$ h. This group includes the RDC (rotary disc), OLDSHUE-RUSTHON, SCHEIBEL, KUHNI, RZE (mixing cell), BTC-RDC (internal baffle tube) type extractors known in the professional field (Chem.Ing.T.52. FIG. No. 3.9.3.). Extractors with eccentric rotary shafts are also used, where the rotary disc is asymmetrically arranged (e.g. LUWA-ARD extractor). Its theoretical number of stages is 1–3/m, specific loadability 20 $m^3/m^2$ h.

Some columnar extractors are also known, where to improve the efficiency of dispersion induced for efficient contact, pulsation is used instead of mixing. These include the liquid pulsating and vibrating extraction columns. In the former one the liquids counterflowing in the column are pulsated with a pulsator (e.g. piston pulsator) connected with the column. The radial mixing of the pulsated liquids, dispersion of one liquid into the other one takes place with dispersing elements arranged in the column. Such dispersing elements may be for example a charge (Interpack charge, Pall ring, porcelain saddle body). Here, the specific loadability is 15–25 $m^3/m^2$ h, the theoretical number of stages 4–7/m, and the rate of pulsation 700–1300 mm/min (Chem.Ing.T.50. FIG. No. 5, 15–19). The dispersing elements may be sieve plates (perforated discs) dividing the column's interior vertically into cells. Their free cross section is 20–30%, specific loadability 30–60 $m^3/m^2$ h, theoretical number of stages 4–7/m, while the rate of pulsation 700–1500 mm/min (Chem.Ing. T.50. FIG. No. 5, 19.). In the vibrator-type extraction columns the liquids are contacted, dispersed by up and down vibration of the perforated disc or sieve plates—pulled over a common bar—with the aid of external pulsator. The best known vibrator type extraction column is the KARR column, where the free cross section of the discs is 50–60%, specific loadability 80–100 $m^3/m^2$ h and the theoretical number of stages 3–6/m (Chem.Ing. T.50. No. 5).

The specific loadability ($m^3/m^2$ h) of the pulsated and non pulsated charged extraction columns is approximately the same, but pulsation of the liquids prevents or at least considerably reduces the channelling frequently occurring in the non-pulsated charged column, furthermore it facilitates renewal of the surface in contact with the continuous phase. The dispersion can be intensified with pulsation, and the theoretical number of stages can be doubled. But some drawbacks in the use of the columns with pulsated charge are that they are sensitive to changes of the load and are unable to react flexibly to fluctuations. Another problem is that solids incidentally present in the liquid upset the extraction process so that the charge- and column-surface becomes dirty. Therefore, the described columns with pulsated charge cannot be used for the extraction of liquid containing solids.

As a result of regular pulsation of the columns, new contacting surfaces are formed, and the dispersion can be intensified in the pulsated sieve plate (perforated disc-type) extraction columns. Consequently, the theoretical number of stages per meter compared with the non-pulsated columns is higher, and compared even with the pulsated charged column their theoretical number of stages, it is even higher by about 25–30%. In addition, the specific load ($m^3/m^2$ h) can also be increased with pulsation. However, its drawback is that the specific loadability range of the pulsated sieve plate extraction columns is very narrow. A further drawback is that due to the considerable dispersion, in certain cases—especially if the liquid to be extracted contains solids—a slowly settling stable emulsion may be formed leading to interruption of the extraction process. Since the sieve plate is sensitive to impurity, these columns are not suitable for the extraction of liquids containing solids.

By vibrating the perforated discs of the vibrating plate-type extraction column (KARR), the specific load ($m^3/m^2$ h) of the column (extractor) can be significantly increased (to the highest value among the columnar extractors), and the dispersion can also be intensified. Consequently, the theoretical number of stages will be favourable. In case of medium or low surface stress, these columns can be used advantageously. However, the mechanism required for vibration of the sieve plates is more complicated, consequently, it is more expensive than the one used for pulsation of liquids, and the degree of complexity increases with the diameter of the column. Even in this case, it is a problem that due to the considerable dispersion-especially in liquids containing solids-slowly settling emulsion may develop that hinders the extraction process. These columns are sensitive to impurities, and are not suitable for the extraction of liquids containing solids.

In general terms it can be said that construction of the extraction columns operated with pulsating auxiliary energy is simpler than that of other extractors, and their cost of investment is only a fraction of the mixing or other type, e.g. centrifugal extractors'.

Centrifugal counterflow extractors are used in the fermentation industry for total extraction of ferment liquids containing biomass. Such outdated apparatuses are the PODBIELNIAK and ROBATEL extractors. Their specific capacity is acceptable, but the theoretical number of stages is low, and because of the high costs of investment and operation their use becomes less and less frequent.

According to another known method (Westfalia), most of the solids is filtered out of the ferment liquids with a vacuum screening drum. The ferment liquid containing little solids (1–3%) is extracted in two steps in counterflow, self-discharging separator: The costs of investment and operation (handling, maintenance, energy utilization, spare parts) of this high-standard apparatus are very high.

Recently, counterflow extraction decanters are used for the total extraction of natural ferment liquids, where even ferment liquid with high (60%) dry substance content can be extracted without prefiltering. Operation of these apparatuses is relatively simple, the extraction is efficient, but their cost of operation and investment are very high.

The invention is aimed at the realization of a columnar apparatus pulsating the liquids to be contacted, mainly in an apparatus suitable for extraction, the construction of which is simple. Its cost of investment is low, specific loadability ($m^3/m^2$ h) is high, and in addition, the theoretical number of stages/m and efficacy are high. Furthermore, the apparatus must be suitable for the economical and efficient extraction of ferment liquids containing solids without emulsion-formation under efficient dispersion and radial mixing in the course of extraction.

The invention is based on the recognition, that if the pulsated liquid is exposed to dispersing effects inducing shear with the aid of built-in elements dividing the column into cells, and the liquid is intensively mixed, then efficient contact is accomplished with an appropriate power input. The risk of clogging and emulsion-formation is eliminated, and the liquid containing solids can be extracted in the apparatus. According to a further recognition, the shearing-dispersing and mixing effect can be achieved by discs containing elastic tongues built into the column, because these pulsated elastic tongues arranged in the plane of the discs pulsate and function as a vibrating valve to disperse by shearing and intensively-radially-mix the liquid phases in the cells. However, the breakdown, which occurs under the shearing effect takes place efficiently yet without considerable formation of emulsion.

On the basis of above recognitions, the objective according to the invention was attained with an apparatus having a closed column provided with a pipe leading into the upper part to admit liquid of higher density, and a pipe leading into the lower part to admit liquid of lower density. A pipe emerges from the lower part of the column to discharge liquid of higher density, and a pipe emerges from the upper part to discharge liquid of lower density. A level-control and propelling force adjusting mechanism is connected with the pipe discharging liquid of higher density to disperse and mix elements surrounding the cells below and above each other in the column; A pulsator is connected with the lower part of the column, and it is characterized by discs forming the dispersing-mixing elements, said discs having elastic tongues capable of vibration in and out of their plane in the course of vibration. A gap runs along their periphery. The apparatus is made of anticorrosive materials. The column is generally cylindrical.

According to a preferred embodiment by way of example, the gap running along the periphery of the tongues is 0.05-1.0 mm wide. Naturally, there is no gap where the tongues join the base plate.

According to another invention criterion, the tongues are arranged in the disc in saw tooth configuration, in one or several lines.

According to another preferred embodiment by way of example, the disc is built up with rigid plates and elastic plates containing the elastic tongues.

A further embodiment of the apparatus is characterized by having stops below and above the elastic tongues crosswise to their longitudinal direction. The stops are normally bars suitable to vary their distance from the tongues.

The invention is described in detail with the aid of the enclosed drawings representing some preferred embodiments and structural details of the apparatus as follows.

Figure 1:
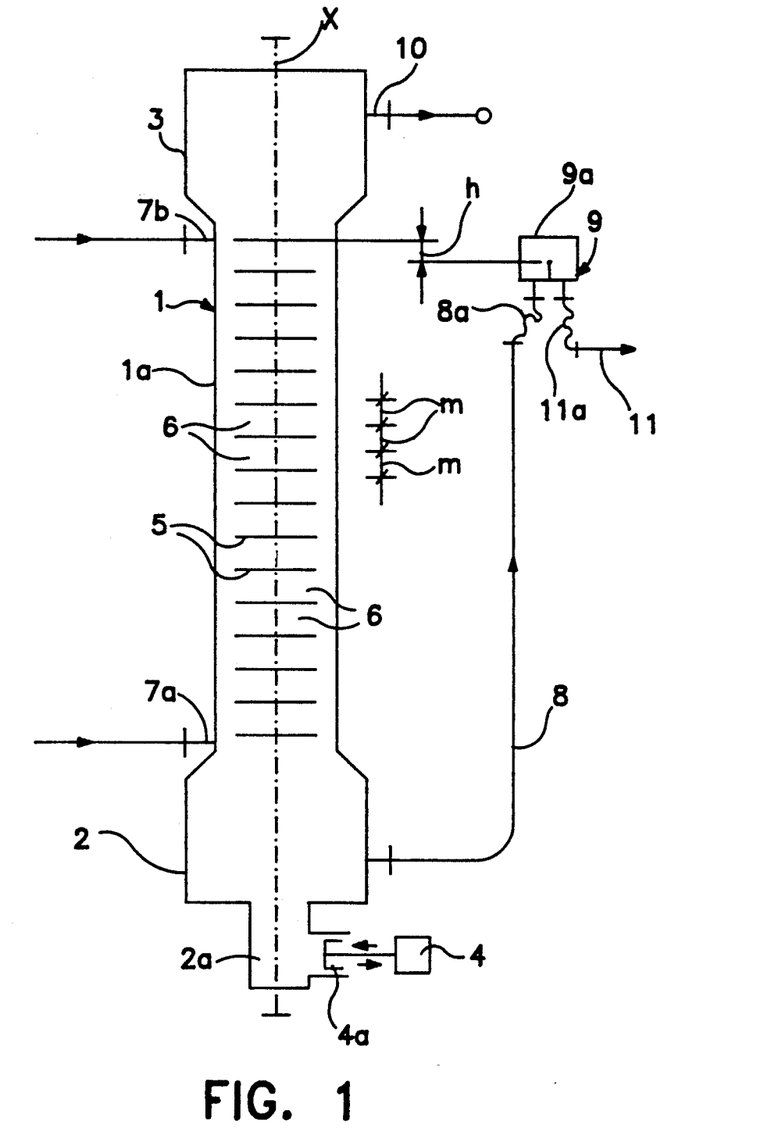
FIG. 1.: Schematic vertical section of a preferred embodiment of the apparatus given by way of example.

The apparatus shown in FIG. 1. has a column 1 possessing a lower settling chamber 2 and an upper settling chamber 3. Diameter of the middle part of the cylindrical column 1 is less than the diameter of the similarly cylindrical lower and upper settling chambers 2 and 3, respectively, and the middle part 1a is several times higher than the chambers. The vertical geometric centreline of column 1 is marked with x in FIG. 1.

Piston pulsator 4 is connected with the lower settling chamber 2. The casing taking in the piston 4a leads into pipe piece 2a closed at the bottom where it emerges from the lower settling chamber 2.

Vertically spaced m discs 5 are built into the middle part of column 1, dividing the middle part 1a into cells 6. The structural design of discs 5 will be described further on.

In the vicinity of the meeting point of the middle part 1a and lower settling chamber 2, a pipe 7a leads below the lowest disc 5 into the column 1 to admit the liquid of lower density. Above the highest disc 5 but beneath the upper settling chamber 3, the pipe 7b leading into the column 1 admits the liquid of higher density. Pipe 8 leaves the lower settling chamber 2 running parallel with the vertical geometric centreline x, and its upper part is connected with a conventional level control and propelling force regulating mechanism 9, its tank 9a is interconnected with the rigid pipe 8 by way of a flexible pipe section 8a. The pipe 11 is used for removal of the extract from the apparatus and is connected with the tank 9a by way of a similarly flexible pipe section 11a. Positioning of the tank's bottom in relation to the inlet orifice of pipe 7b, and thereby the level control and propelling force adjustment are accomplished by lifting or lowering the tank. This is made possible by the flexible pipe sections 8a, 11a. Pipe 10 for removal of the raffinate emerges from the upper part of the upper settling chamber 3. The position of the locks is shown in FIG. 1. by short lines drawn crosswise to the pipes.

Figure 2:
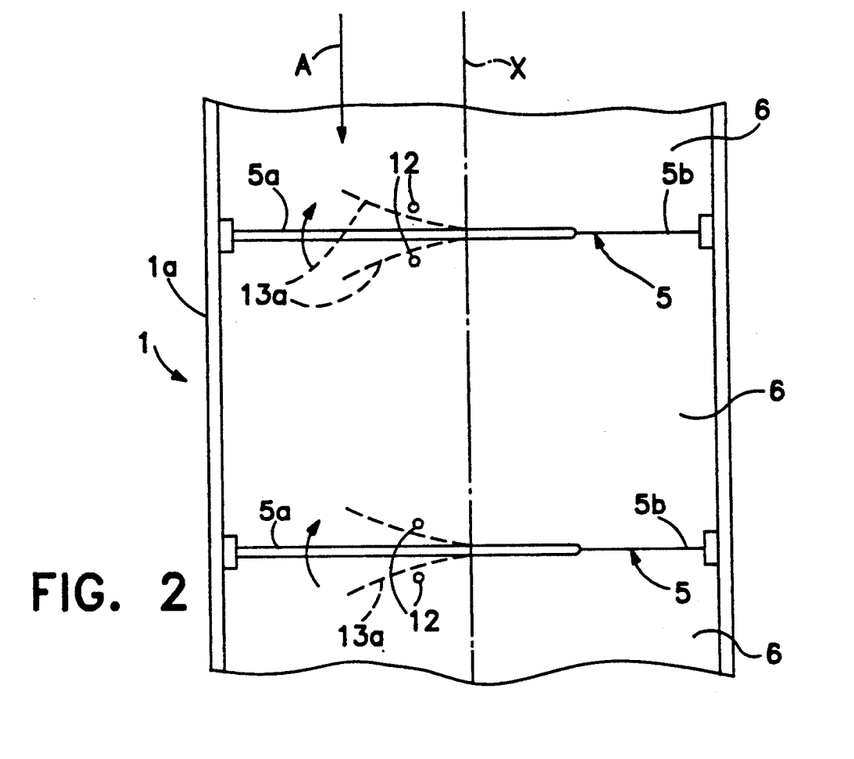
FIG. 2.: Schematic vertical section of two discs of the apparatus according to FIG. 1. and a cell surrounded by them, drawn to a larger scale.
Figure 3:
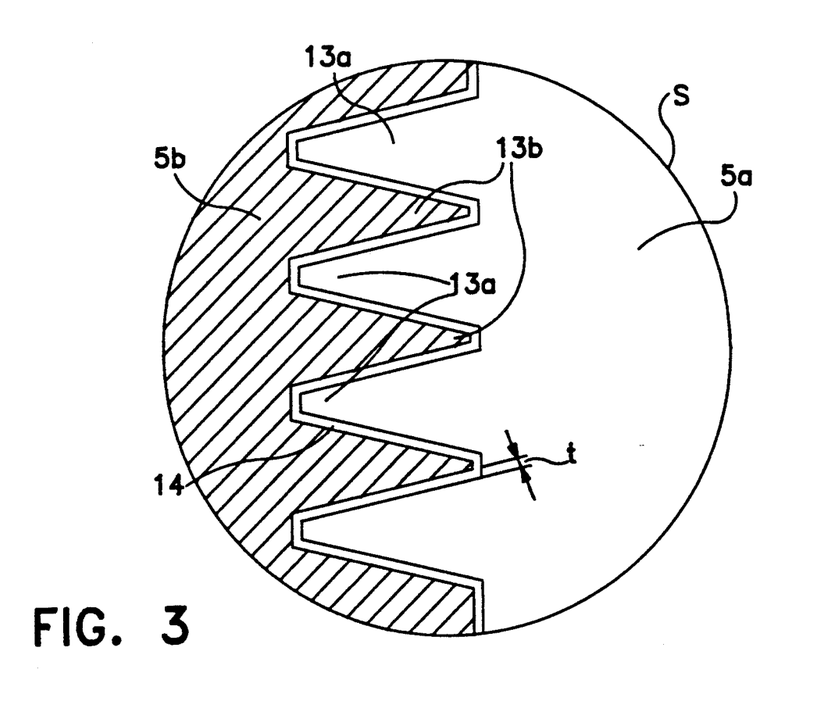
FIG. 3.: View from the direction of arrow A marked in FIG. 2.

The arrangement of the two discs 5 in column 1 during operation, and the structural design of a disc 5 are drawn to a larger scale in FIGS. 2. and 3. As clearly shown in FIG. 3., the disc 5 consists of two parts formed by serrated flat plates and the tongues 13a, 13b of the saw tooth configurations fit between each other so as to have a continuous zigzag gap 14 between them. The width t of which is suitably between 0.05 and 1.0 mm. For the sake of lucidity, the rigid plate 5b of disc 5—the tongues 13b of which are unable to elastic displacement—is marked by hatching. On the other hand, the tongues 13a of the elastic plate 5a can be vibrated by the use of external force. The elastic plate can be made of plastic, or metal, preferably of elastic acid-proof steel, spring bronze or similar elastic metal plate. It is noted that pairs of tongues 13a, 13b may be arranged in several lines in each disc 5, mainly in case of large disc diameters. The rigid plate 5b can be made for example of porcelain. The plate thickness fundamentally depends on the type of plate material. During vibration of tongues 13a the free cross section of the discs 5 varies, and their variability would be desirable even during operation. In order to limit vibration of the tongues 13a—as shown in FIG. 2.—rigid stops 12 are fixed crosswise to the longitudinal direction of tongues 13a on both sides of the discs 5. By varying their position, the free cross section of the discs 5 can be changed. The stops 12 are suitably bars.

Figure 4:
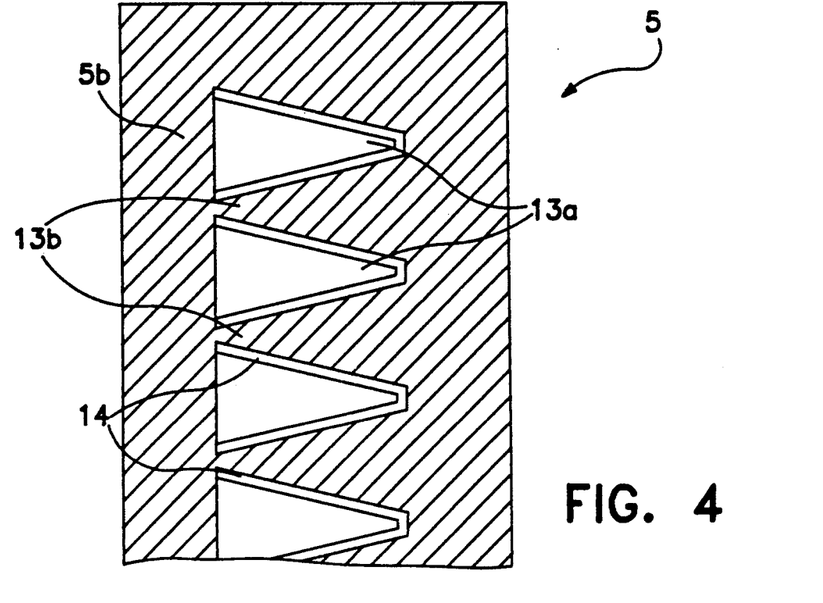
FIG. 4. and 5.: Further possible design of the tongues positioned in the plane of discs.

FIG. 4. is intended to demonstrate that if both tongue-lines 13a, 13b of disc 5 are made of elastic plate, then the tongues can be machined from a single plate with very simple technology, by cutting along the zigzag line suited to the gap 14. (FIG. 4. illustrates the disc 5 only in part).

Figure 6:
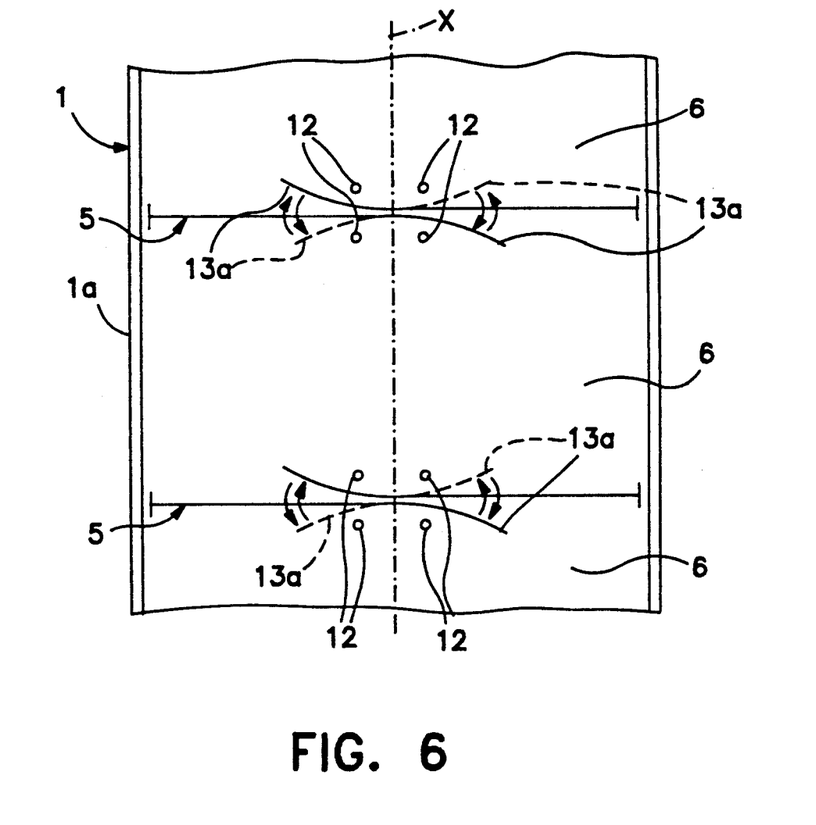
FIG. 6.: Embodiment of the apparatus according to FIG. 1. drawn to a larger scale, where the discs contain elastic tongues.

FIG. 6. shows that the two stops 12 are provided beneath and above the disc 5 for the disc containing only elastic tongues 13a on both sides of the vertical geometric centerline. This design is necessary to limit the vibration of the oscillating elastic tongues 13a for both tongue-lines.

Figure 5:
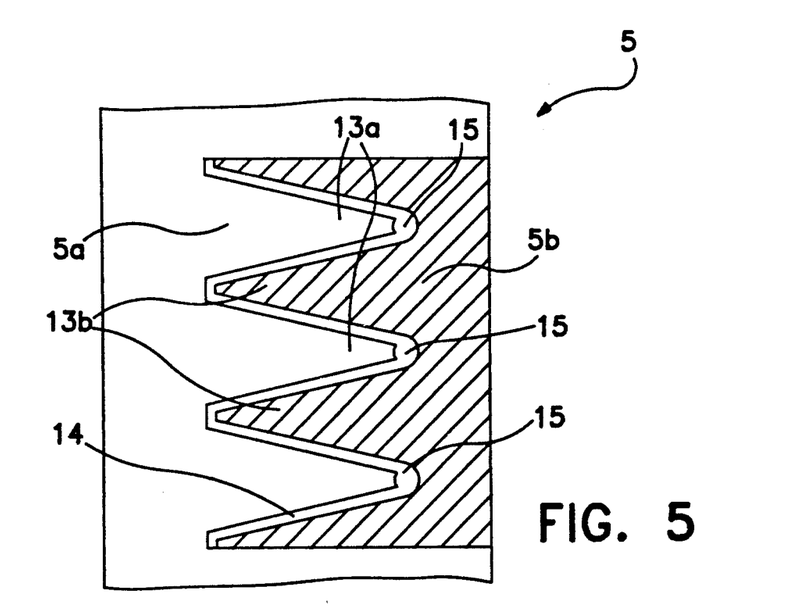

If it is necessary to increase the specific free cross section of the disc 5, according to FIG. 5. (where the same reference numbers were used as in FIG. 3) - the end of the elastic tongues 13a can be cut along a curve, i.e. the tongues 13a are shorter than in the embodiments according to FIGS. 3 and 5. Thus circular holes 15 are made in disc 5 (in addition to the zigzag gap 14) because semi-circular cut-outs are in the rigid plate 5b at the end of tongues 13a. The holes 15 increase the specific free cross section of the disc 5.

The apparatus according to FIG. 1-6. functions as follows:

The liquid of lower density and the liquid of higher density are admitted to the column 1 through pipe 7a underneath and pipe 7b on the top respectively. (It is noted that flow direction of the liquids and operation of the pulsator 4 are marked by arrows drawn over the pipes of FIG. 1.) In describing the operation of the apparatus according to FIG. 2., it is assumed that the liquid of lower density contains the active ingredient to be extracted, and the liquid of higher density is the one to be extracted. Under the influence of differential density caused by the pulsator 4, the liquids regulated with the level control and propelling force adjusting mechanism in column 1 counterflow in the field of gravitation, i.e. the liquid of higher density flows down and the liquid of lower density flows up, since the latter one flowing down forces the former one upwards. In the course of counterflow, the elastic tongues 13a (kept in permanent vibration by the pulsated liquids (i.e. external force) as already shown by dashed lines in FIG. 2) break up the denser liquid into shearing-dispersing drops, whereby dispersion phase is brought about, and intensive radial mixing takes place between the phases in the cells 6. The drop formation is gentle, and the size of the drops will become even visually steady. The size of the holes formed in the course of vibrating the tongues 13a varies automatically, depending on the rate of pulsation and specific load; and movement of the tongues 13a is limited by stops 12. The high flow velocities in the gaps 14 safely prevent clogging this danger exists in known extractors, where the liquid contains solid phase).

Returning to FIG. 1.: Separation of the liquid phases in the lower 2 and upper settling chamber 3 of column 1 takes place merely under the influence of gravitation. The liquid of lower density (raffinate) relieved of the active ingredient leaves the upper settling chamber 3 through pipe 10, while the liquid of higher density, including the active ingredient (extract), leaves the column 1 through pipe 8 emerging from the lower settling chamber 2. The liquid than passes from tank 9a of the level control and propelling force adjusting mechanism 9 through pipe 11.

Figure 7:
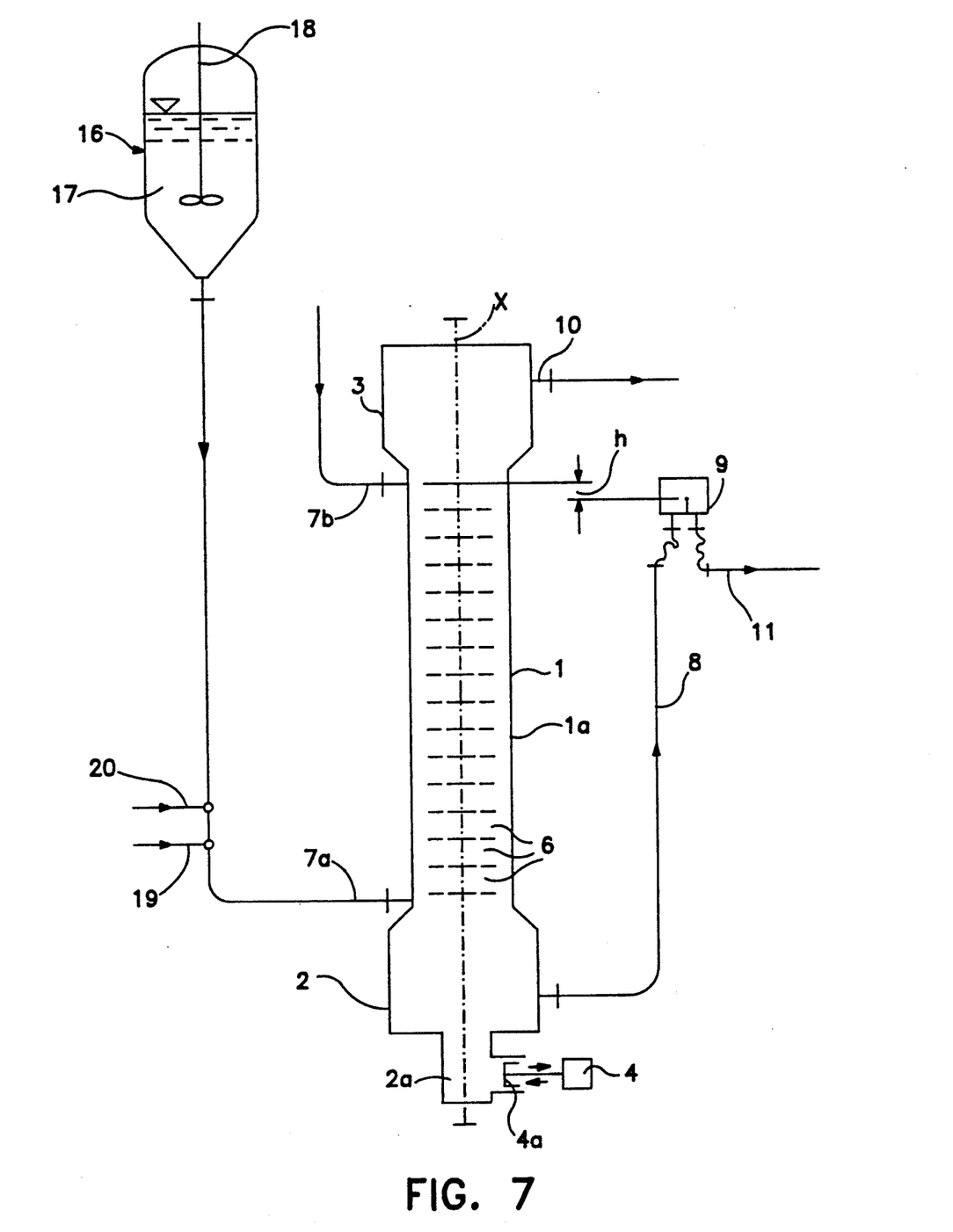
FIG. 7.: Schematic vertical section of the apparatus suitable for extraction of ferment liquid.

FIG. 7. shows the apparatus according to the invention in connection with its use for extracting the natural ferment liquid. The parts are marked with the same reference numbers as those used in FIG. 1. In this case, the pipe 7a emerges from the tank 17 of fermentor 16, and a conventional propeller mixer 18 reaches into the tank. Pipe 7b is used to admit the solvent, while the liquids facilitating the extraction are admitted to the system through pipes 19, 20 leading into the natural ferment liquid-carrying pipe 7a.

The apparatus according to FIG. 7. functions as follows:

The natural ferment liquid containing the biomass is in the phase of lower density, while the methylene chloride producing the is in a phase of higher density. The latter is admitted to the column 1 on the top, while the former one is admitted at the bottom through pipes 7b and 7a. Load of the column 1 varies between 8 and 17 $m^3/m^2$ h, the optimal rate of pulsation is 0.6 cm/s, and ratio of the solvent to ferment liquid is between 1:1 and 1:2. By actuation of the pulsator 4, the vibrating tongues of discs 5 produce a shearing-dispersing and radial mixing effect as described in connection with FIGS. 1-6. Efficiency of the extraction is over 95% with the apparatus according to the invention, and the ferment liquid can be extracted without the danger of emulsion formation. The total biomass is discharged with the raffinate in the course of the continuous extraction, so that the extract no longer contains floating solids. Interruption of the operation for technical reasons does not influence the extraction to any significant degree.

The benefits associated with the invention are summed up as follows:

Loadability of the apparatus according to the invention is high, it is not sensitive to load variation, and is highly efficient in a wide load interval owing to the reduced backmixing. The theoretical number of discs per meter (stage number) is very favourable entailing reduction of the column's height. Thus the space requirement is small, and demand upon labour and the cost of assembly are much lower than those of the known apparatus of similar capacity. The necessary residence time of the two admitted phases in the apparatus volume corresponding to a theoretical stage is very short, favourably influencing the extraction efficiency. The energy required for operation of the apparatus (there is no rotating part) is low but the cost indices associated with the operation and investment are also favourable owing to the simple construction. It is a major advantage, that there is no emulsion formation in the apparatus during operation, and owing to the high liquid velocities flowing through the gaps of varying width which are surrounded by the vibrating tongues, no danger of clogging and downtime exists even if the liquid containing solid phase is extracted. Thus natural ferment liquid containing biomass can also be extracted with the apparatus according to the invention.

Naturally, the invention is not restricted to the embodiments of the apparatus given by way of example, but it can be realized in many ways within the protective scope defined by the claims points.

We claim:

1. In a device for extracting liquids, an apparatus for contacting liquids of different densities, the apparatus comprising:
   - a column having a closed interior, a lower part and an upper part, with a first conduit coupled to the upper part to supply a liquid of higher density and a second conduit coupled to the lower part to supply liquid of a lower density;
   - a level control and propelling force adjusting mechanism coupled to the lower part of the column through a third conduit to discharge the liquid of higher density from the column;
   - a fourth conduit coupled to the upper part of the column to discharge the liquid of lower density;
   - dispersing and mixing means having a plurality of discs vertically arranged in the column to define a plurality of cells, the discs each having at least one elastic tongue and a gap along a periphery of the elastic tongue, the tongue capable of vibrating in and out of a plane defined by the surface of the disc; and
   - pulsating means for causing the discs to vibrate coupled to the lower part of the column.

2. Apparatus according to claim 1, wherein the gap along the periphery of the tongue has a thickness which is 0.05–1.0 mm.

3. Apparatus according to claim 1 or 2, wherein each disc has a plurality of tongues arranged in the disc in a saw tooth configuration in at least one line.

4. Apparatus according to claim 1, wherein the discs comprise rigid plates and elastic plates in which the tongues are formed.

5. Apparatus according to claim 1, wherein the apparatus further comprises stops disposed above and below the elastic tongues which are arranged crosswise to a longitudinal direction of the tongues.

6. Apparatus according to claim 5, wherein the stops are adjustable with respect to their distance from the tongues.

* * * * *

UNITED STATES PATENT AND TRADEMARK OFFICE
CERTIFICATE OF CORRECTION

PATENT NO. : 5,194,152
DATED : March 16, 1993
INVENTOR(S) : Takacs et al

It is certified that error appears in the above-indentified patent and that said Letters Patent is hereby corrected as shown below:

In column 3 at line 44 change "column;" to -- column. --.

In column 4 at line 7 change "scale:" to -- scale. --;
at line 49 change "adjustment" to -- adjustment, --;
at line 52 change "raffinate emerges" to -- raffinate, emerges --.

In column 5 at line 3 change "in case" to -- in the case --;
at line 24 change "centerline." to -- centerline $\underline{x}$. --;
at line 65 change "load;" to -- load, --;
at line 67 change "this" to -- (this --.

Signed and Sealed this

Twenty-fifth Day of April, 1995

*Attest:*

BRUCE LEHMAN

*Attesting Officer*  *Commissioner of Patents and Trademarks*